United States Patent

Aston

[15] 3,640,618
[45] Feb. 8, 1972

[54] METHOD AND APPARATUS FOR PHOTOGRAPHIC COLOR PRINTING

[72] Inventor: Keith Aston, Cheam, Surrey, England
[73] Assignee: The Pavelle Corporation, New York, N.Y.
[22] Filed: Mar. 10, 1969
[21] Appl. No.: 805,529

[30] Foreign Application Priority Data

Mar. 11, 1968 Great Britain......................11,748/68

[52] U.S. Cl................................355/35, 355/32, 355/38
[51] Int. Cl. .....................................................G03l 27/32
[58] Field of Search......................355/32, 34, 35, 37, 38, 88

[56] References Cited

UNITED STATES PATENTS 2,841,065  7/1958  Gage et al................................355/88
3,090,289  5/1963  Gundelfinger..........................355/88
3,447,871  6/1969  Neale........................................355/88

*Primary Examiner*—Samuel S. Matthews
*Assistant Examiner*—Edna M. Bero
*Attorney*—Darby & Darby

[57] ABSTRACT

Apparatus for printing a photographic color print from a color transparency or negative includes a compound color filter consisting of two additive color filters to provide a device having the speed of operation of a conventional subtractive printer apparatus when printing color negatives of good color balance. The apparatus automatically introduces the accuracy of an additive printer system when unbalanced color negatives are being printed.

7 Claims, 4 Drawing Figures

INVENTOR
KEITH ASTON

METHOD AND APPARATUS FOR PHOTOGRAPHIC COLOR PRINTING

This invention relates to a method and apparatus for photographic color printing.

More particularly this invention relates to a method and apparatus for photographic color printing of the kind wherein exposure of all color components of the printing material initially takes place simultaneously and the exposure of each color component is controlled by photoelectric control means to be terminated automatically when sufficient exposure as determined by said control means has taken place. Such a control method, hereinafter termed a method "of the kind referred to," is well known in the art.

The principal object of this invention is to provide an automatic color printer that will give or yield the speed of operation of the conventional subtractive printer when handling normal negatives of good color balance but automatically introduces the desirable feature of an additive printer system as soon as out of balance negatives are introduced.

A more specific object of this invention is to provide an apparatus and method of utilizing certain additive color possibly in combination with conventional subtractive filters, wherein the additive filters terminate the exposure of one color component and also converts the light into selective narrow-band light for completing the exposure of any remaining color images.

Another object of the instant invention is to provide a color-printing system in which the monitoring photocells can obtain a more accurate density assessment of the out of balance negatives than is the case in conventional subtractive filter printers.

According to the present invention there is provided a method and apparatus for photographic color printing of the kind referred to wherein the exposures of all but one of the color components of the printing material are each terminated by the introduction into the exposing light beam of an appropriate subtractive filter and the exposure of said one color component is terminated by the introduction into the exposing light beam of appropriate additive filters which pass predetermined amounts of the other color components only.

It will be appreciated that the exposure time for the said one color component may be greater or less than the exposure times for the other color components or may fall within the range of exposure times of the other components and thus the additive filters may be introduced into the exposing light beam before or after the subtractive filters are introduced, or may be introduced after one or more of the subtractive filters are introduced and before all the subtractive filters are introduced. Generally speaking the sequence of introduction of the filters (i.e., both subtractive and additive filters) will depend upon the color balance of the photographic color negative or transparency from which a print is to be made. Consequently, in order to preserve, in so much as is possible, the color balance in the exposing light beam when the said compound filter is introduced into the exposing light beam before all or the majority of the subtractive filters are introduced it is preferred that the additive filters pass equal amounts of the said other color components.

In practice the printing material is sensitive to the three primary color components red, green and blue. Thus, for example, the additive filters may be such as to pass equal amounts of the red and green color components while suppressing the blue color component. Alternatively, the additive filters may suppress the red or green color components in which cases they would be arranged to pass equal amounts of the blue and green or blue and red color components respectively.

Clearly if, say, red and green additive filters (blue suppressing) are introduced into the beam first before the subtractive filters for suppressing the red and green color components are introduced, the intensities of the red and green color components in the filtered beam will be reduced. In the case where the additive filters pass equal amounts of the red and green color components, it is clear that the red and green color component intensities will be halved in the filtered beam so that the exposure times of the portions of the red and green color component exposures remaining after the introduction of the additive filters will be doubled. In most applications this lengthening of the exposure times of those color components whose exposure has not terminated prior to introduction of the additive filters into the exposing light beam does not represent any disadvantage; in some applications steps may be taken to eliminate this effect, e.g., the exposing light intensity may be increased simultaneously with the introduction into the exposing light beam of the additive filters.

In a preferred arrangement, the exposing light beam is arranged to have a cross section which is symmetrical about an axis of symmetry, and the additive filters consist of equal density red and green color filters mounted side-by-side by in a common carrier to form a compound filter and arranged so that when the compound filter is introduced into the light beam the junction between the two filters corresponds substantially with the axis of symmetry of the exposing light beam.

Since the exposing light beam is generally asymmetrically filtered by the said compound filter it will, of course, be necessary to mix the filtered light prior to illumination of the negative or transparency. Such mixing can be accomplished in the conventional manner by passing the filtered light into a diffuser box or the like having white matt internal surfaces and including an opal diffuser through which the mixed filtered light diffuses to illuminate the negative or transparency.

The accompanying drawings show one form of color head according to this invention for a photographic color printer or enlarger. In these drawings FIG. 1 is a top plan view of the color head with an upper part of the housing removed;

Figure 1:
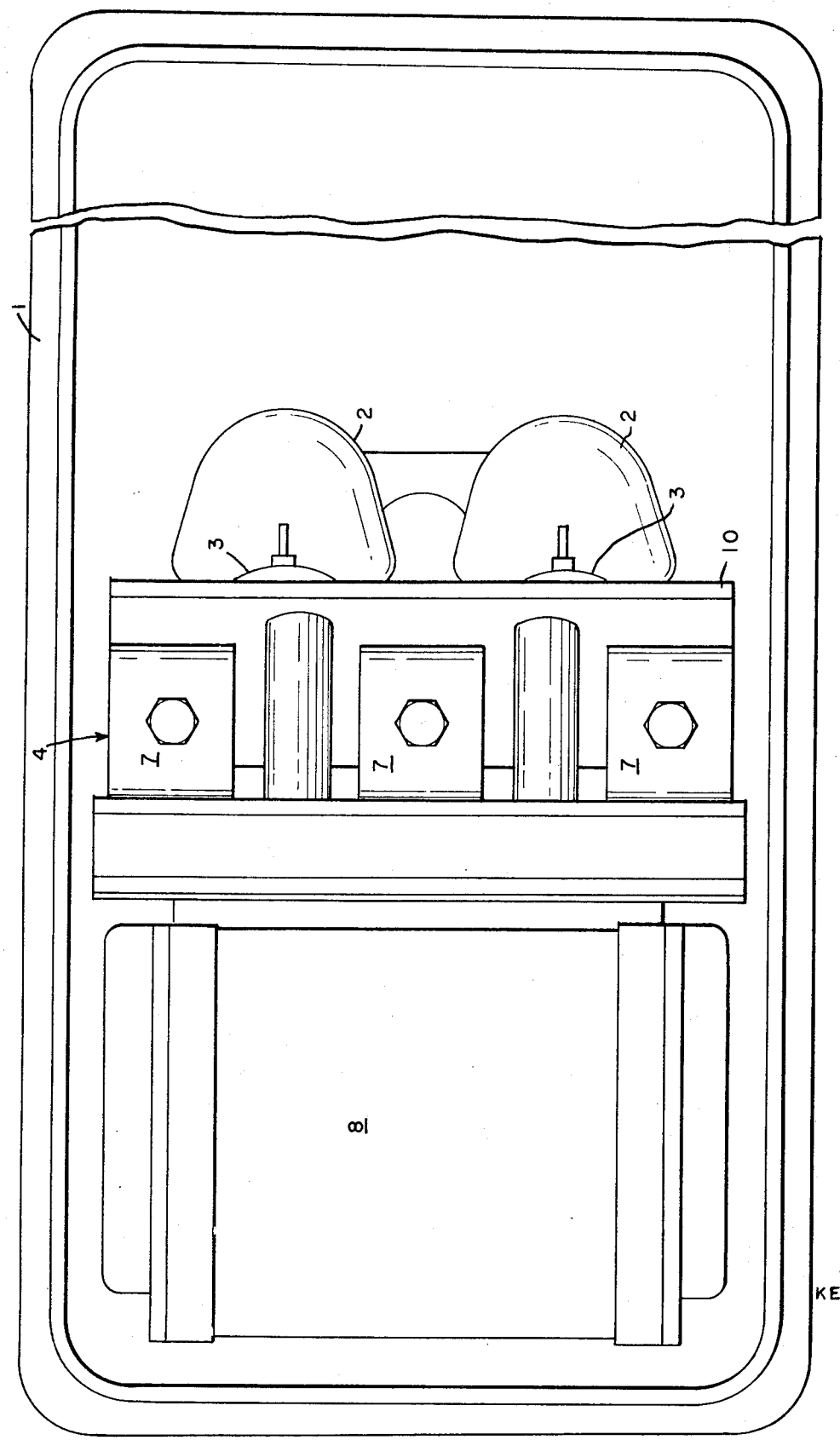

Referring now to the drawings, a color head for a photographic color printing or enlarging apparatus in accordance with this invention has a lamp housing 1 for a pair of lamps 2 which include integral reflecting mirrors 3 for generating the exposing light beam of the apparatus.

Figure 2:
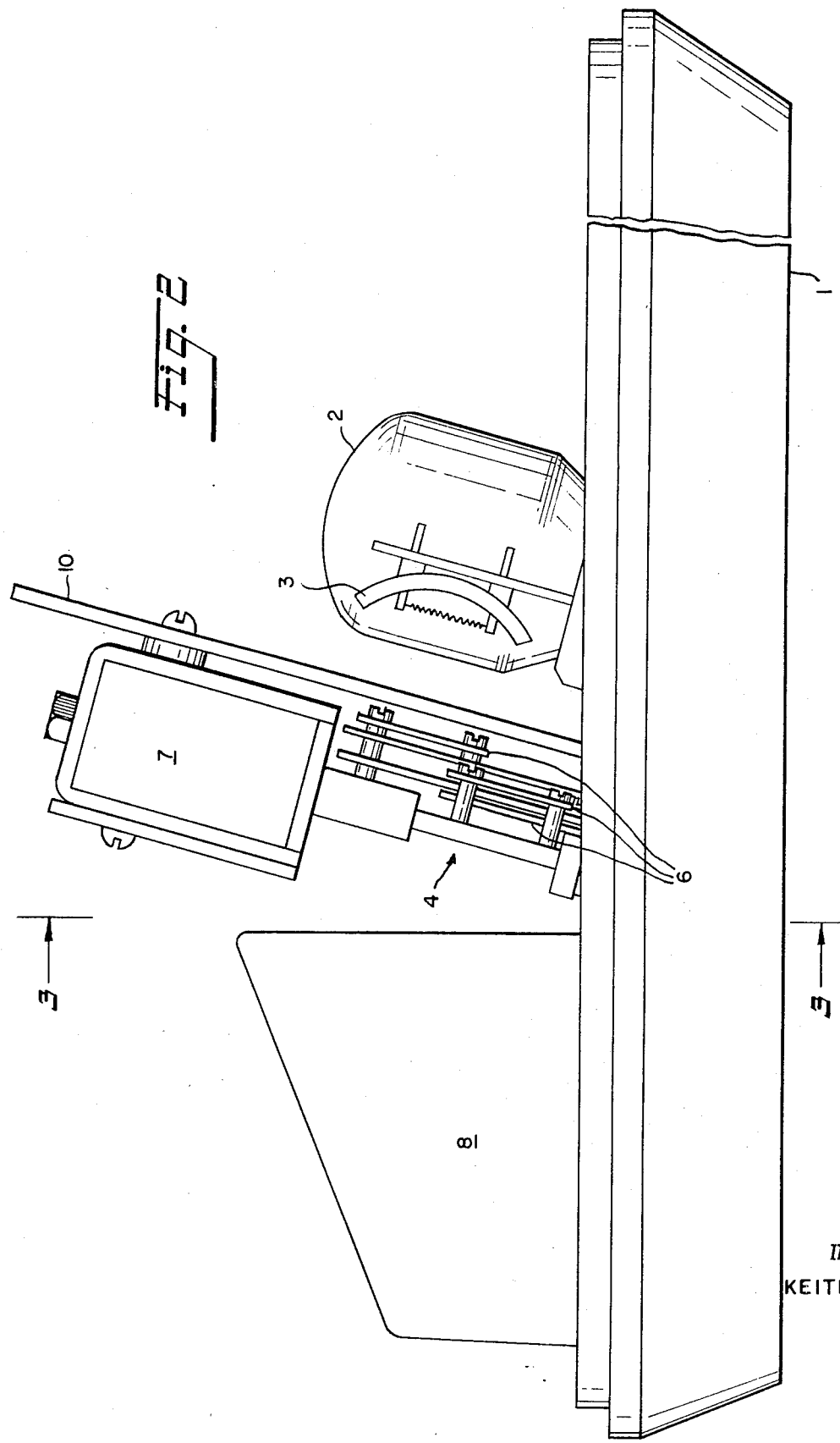
FIG. 2 is a side elevational view of the color head of FIG. 1.

The color head also includes a color filtering assembly generally indicated by the reference numeral 4. There is a filtering assembly associated with each lamp, only one of which is described in the foregoing since the two are identical. As more clearly seen in FIGS. 2 and 3, each filtering assembly 4 includes two subtractive color filters and a compound color filter 5 (see FIG. 3) mounted in solenoid operated carriers 6 (FIG. 2) so as to be individually movable into and out of the path of the exposing light beam. Photoelectric control means (not shown) are provided for actuating the solenoids 7 to insert the filters into the exposing light beam at the appropriate times (as determined by photoelectric means) to terminate the exposures of the color components of the sensitized printing material. A light-mixing box 8 is provided into which the filtered light from the color-filtering assembly 4 passes for mixing prior to illuminating through an aperture 9 in the housing 1 the photographic color negative or transparency to be printed.

As a specific example, each color-filtering assembly 4 may have a yellow complementary subtractive filter (not shown) for terminating the exposure of the blue color component of the sensitized printing material, a magenta complementary subtractive filter (also not shown) for terminating the exposure of the green color component of the sensitized printing material, and the compound filter 5 for terminating the exposure of the red color component of the printing material.

Figure 3:
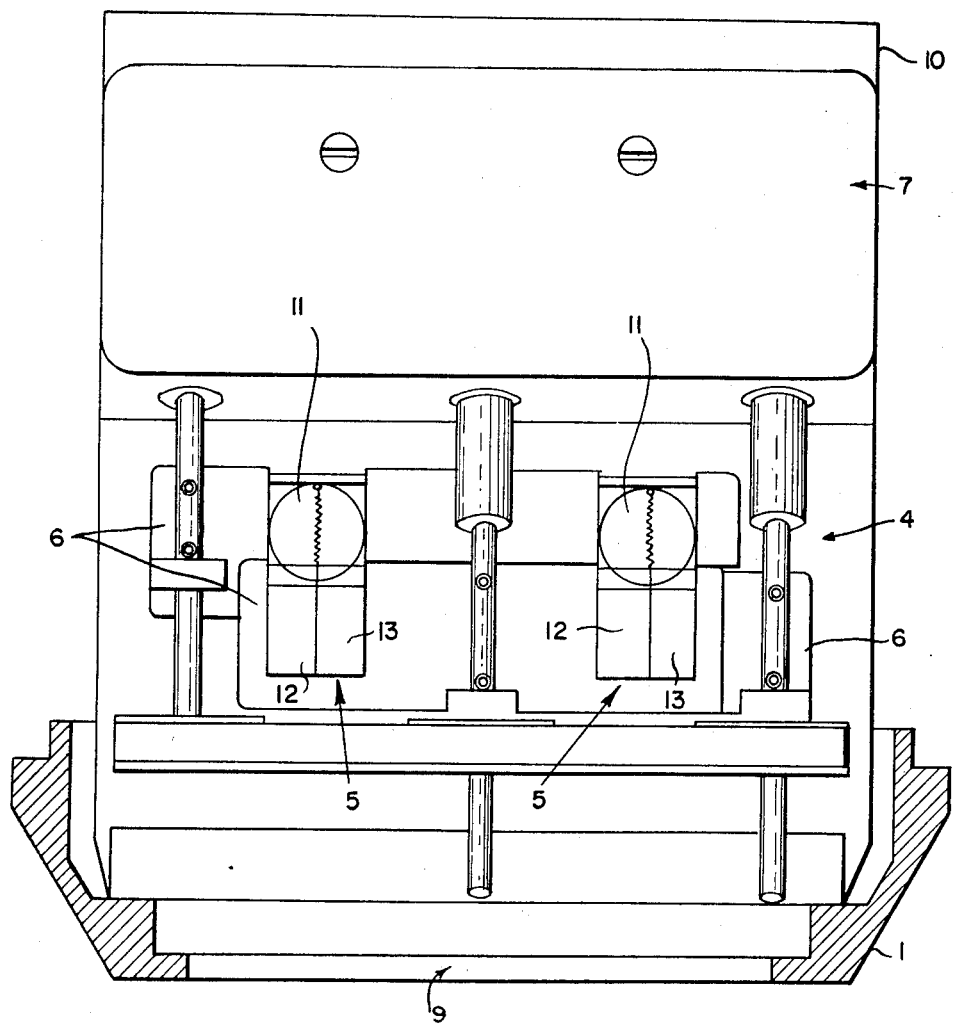
FIG. 3 is a sectional view taken on the line III—III of FIG. 2.

The color-filtering assemblies 4 including the carriers 6 and solenoids 7 are conveniently mounted on a supporting plate 10 which is provided with circular apertures 11, as shown in FIG. 3, so as to ensure that the exposing light beam cross section is circular at the location of the respective color-filtering assembly. The compound filter 5 for terminating the red exposure consists of blue and green filters 12 and 13 mounted side-by-side in a common carrier 6 and arranged such that when the compound filter 5 is introduced into the exposing light beam the junction of the blue and green filters 12 and 13 substantially bisects the cross section of the beam. With the yellow and magenta filters out of the exposing light beam when the compound filter 5 is inserted into the beam, the red component of the exposing light beam will be eliminated and the blue and green components will be passed at half their original intensity.

As previously mentioned herein in practice the exposures of the red, green and blue color components of the printing material may be terminated in any order depending upon the color balance of the negative or transparency to be printed.

Figure 4:
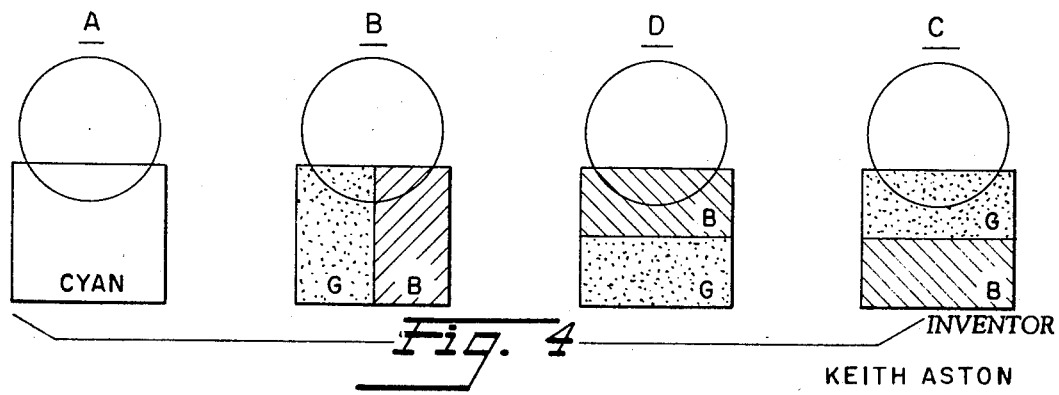
FIG. 4 is a diagram showing the positioning of certain filter combinations with respect to the light beam.

For example: to terminate the exposure of the red-sensitive component, a normal subtractive printer would introduce a cyan filter, and the remaining exposure of the blue and green sensitive components would be made with this filter in place. In the system of this invention, a blue, and a green filter are each introduced into half of the light beam, and the light subsequently well mixed as illustrated in FIG. 4. In both cases, the resulting light is minus red, but in the system of the invention the resulting light is a mixture of selectively filtered blue light with selectively filtered green light, so that the remainder of the exposure is completed under additive printer conditions.

Even if only one of the conventional subtractive filters is replaced by an additive compound filter, a definite advantage can be obtained, as the following example illustrates. It is assumed in this example that a conventional cyan filter is replaced by the blue/green compound filter of this invention.

Example: a conventional subtractive printer, and a printer operating with one compound filter according to the system of this invention are both set up to print a normal negative in about 1 second for all three exposure times, i.e., the three filters come in more or less simultaneously to terminate the three component exposures. Under these conditions, as the whole of the exposure has been made by white light in both printers, similar results can be expected from both systems.

A seascape or mountain scene negative is now printed in both of the printers. Such negatives are commonly encountered, and are notoriously difficult to print, because the predominance of blue and ultraviolet light in the original scene results in a negative with a strong orange-yellow cast, i.e., relatively heavy in yellow and magenta images, and weak in cyan.

In this case, the subtractive printer will introduce a cyan filter quite early in the exposure cycle, and the remainder of the exposure of the heavy yellow and magenta images will be completed with this filter in place. With the printer of this invention, however, a selective blue and green compound filter is introduced for the completion of the exposure, and this results in greatly improved gradation and separation of the color images just at the time when it is most needed—i.e., when printing an out-of-balance negative. The more the negative is out of color balance, the greater the proportion of the total exposure that is made through these selective filters. Badly out-of-balance negatives are exposed almost under additive conditions. In FIG. 4 Diagram A shows a conventional subtractive cyan filter partially introduced into the light beam. It is only possible to reduce the red component by means of the cyan filter. Diagram B shows how a similar result can be obtained by means of the split additive filter. In this case the two components of the split filter are both introduced equally into the light beam. Diagram C shows how by rotating the split filters until they are horizontal with the green filter at the top, it is possible to introduce green filtration only into the light beam. Diagram D shows how by rotating the filter again to bring the blue filter to the top, filtration of this color only can be introduced into the light beam.

The effects produced by methods C and D are not possible when using subtractive filtration.

When it is desired to reduce the red component, in the printing system of the instant invention, a selective blue and a selective green filter may be mounted side by side, as illustrated in FIG. 4B.

It should be understood, of course, that other combinations other than the red and green compound filter as shown in FIG. 3 or the blue and green compound filter as shown in FIG. 4 may be constructed and used according to the principles of this invention as will be readily understood by one skilled in the art.

It is preferred that the compound filter of this invention be utilized out or near the nodal point as illustrated in U.S. Pat. No. 3,260,152 or in British Pat. No. 1,121,382, with subsequent mixing with the light in a diffuser box.

I claim:

1. Color-printing apparatus of the type wherein white light is used to expose a sheet of color-sensitive material sensitive to three primary colors with exposure of said material to light of each of said three colors being terminated by respective light-blocking means associated with said three colors, each of said blocking means preventing light of its associated color from impinging upon said material, said apparatus also including photosensitive means for actuating said blocking means depending upon the amount of said colors in the exposing light beam after it has passed through the image to be reproduced, the improvement wherein at least one of said blocking means includes two additive filters for passing light of two of said colors, each of said additive filters passing light of only one of said primary colors, and means for inserting said additive filters into substantially the entire path of the exposing light beam when it is desired to terminate exposure of said material to light of the other of said colors.

2. Color-printing apparatus as recited in claim 1, wherein the two additive filters are mounted side-by-side.

3. Color-printing apparatus according to claim 1, wherein the densities of said additive filters are substantially equal.

4. Color-printing apparatus according to claim 1, wherein said additive filters pass only blue and green light.

5. Color-printing apparatus according to claim 1, including means for increasing the intensity of the exposing light beam when said additive filters have been inserted into it.

6. Color-printing apparatus as recited in claim 1, wherein the optical frequencies passed by said additive filters are selected in dependence upon the spectral sensitivity of said photosensitive means to the colors passed by said additive filters.

7. Color-printing apparatus as recited in claim 2, wherein the other two blocking means include respective subtractive filters for terminating the exposure of said material to light passed by said two additive color filters.

* * * * *

PO-1050
(5/69)

UNITED STATES PATENT OFFICE
CERTIFICATE OF CORRECTION

Patent No. 3,640,618           Dated February 8, 1972

Inventor(s)  Keith Aston

It is certified that error appears in the above-identified patent and that said Letters Patent are hereby corrected as shown below:

Column 1, line 22, "color possibly" should be --color filters possibly--; line 49, "one ore more" should be --one or more--.

Signed and sealed this 17th day of October 1972.

(SEAL)
Attest:

EDWARD M. FLETCHER, JR.          ROBERT GOTTSCHALK
Attesting Officer                Commissioner of Patents